(12) United States Patent
Bencuya et al.

(10) Patent No.: US 7,067,786 B1
(45) Date of Patent: Jun. 27, 2006

(54) METHOD AND SYSTEM FOR RESETTING IMAGE SENSORS

(75) Inventors: Selim Bencuya, Irvine, CA (US); Richard Mann, Torrance, CA (US); Hiok-Nam Tay, Irvine, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 11/083,466

(22) Filed: Mar. 17, 2005
(Under 37 CFR 1.47)

Related U.S. Application Data

(63) Continuation of application No. 10/423,681, filed on Apr. 25, 2003, now Pat. No. 6,911,640.

(60) Provisional application No. 60/376,748, filed on Apr. 30, 2002.

(51) Int. Cl.
*H04N 3/14* (2006.01)
*H04N 5/335* (2006.01)

(52) U.S. Cl. .................................... 250/208.1; 348/308

(58) Field of Classification Search ............ 250/208.1, 250/214 R; 348/308, 313; 257/291, 292
See application file for complete search history.

(56) References Cited

U.S. PATENT DOCUMENTS

2002/0018133 A1* 2/2002 Mendis ....................... 348/308

* cited by examiner

*Primary Examiner*—Thanh X. Luu
*Assistant Examiner*—Tony Ko
(74) *Attorney, Agent, or Firm*—Farjami & Farjami LLP

(57) ABSTRACT

An exemplary CMOS image sensor comprises a reset transistor, a photodiode, reset drain voltage circuitry, and reset gate voltage circuitry. A cathode of the photodiode is connected to a source of the reset transistor, and an anode of the photodiode is connected to ground. The reset drain voltage circuitry is connected to a drain of the reset transistor, and the reset gate voltage circuitry is connected to a gate of the reset transistor. During an exemplary hard reset operation, the reset drain voltage circuitry supplies a first drain voltage to the drain of the reset transistor in accordance with a determined level of light for exposure, which is determined dynamically. According to another exemplary reset operation, a hard reset phase is immediately followed by a soft reset phase.

18 Claims, 7 Drawing Sheets

METHOD AND SYSTEM FOR RESETTING IMAGE SENSORS

RELATED APPLICATIONS

The present application is a continuation application of U.S. application Ser. No. 10/423,681, filed Apr. 25, 2003, now U.S. Pat. No. 6,911,640 which claims the benefit of U.S. provisional patent application Ser. No. 60/376,748, filed Apr. 30, 2002, which is hereby fully incorporated by reference in the present application.

BACKGROUND OF THE INVENTION

1. Field of the Invention

The present invention is generally in the field of solid state imaging devices. More specifically, the invention is in the field of Complementary Metal Oxide Semiconductor ("CMOS") imaging devices.

2. Related Art

CMOS image sensors are increasingly used in a variety of electronic systems and applications to provide motion picture or still picture capability. CMOS image sensors offer a number of technical advantages over alternative devices, such as low power consumption, high level of integration (and corresponding low total system cost), and flexible operating modes, among others.

A significant problem associated with conventional CMOS image sensors is the noise present in the images produced by such devices. For example, conventional CMOS image sensors suffer from noise associated with the process for resetting the photodiode in each pixel to a known potential after each exposure and in preparation for the next image. This noise, also referred to as "reset noise" or "KTC noise," is often the single largest source of noise in camera systems employing conventional CMOS image sensors. The reset noise is proportional to the square root of KTC, where C is the capacitance of the sense node or photodiode/source follower gate combination in a typical active pixel sensor. Reset noise is typically 30 to 40 electrons one-sigma. Reducing the capacitance of the sense node can reduce reset noise, but results in a corresponding reduction in the total charge that can be collected and therefore undesirably reduces the overall dynamic range in the camera system.

Accordingly, there is a strong need in the art for a method of reducing reset noise in a CMOS image sensor.

SUMMARY OF THE INVENTION

The present invention is directed to a method of reducing reset noise in a CMOS image sensor. In one exemplary embodiment, the CMOS image sensor comprises a reset transistor, a photodiode, a reset drain voltage circuitry, and a reset gate voltage circuitry. A cathode of the photodiode is connected to a source of the reset transistor, and an anode of the photodiode is connected to ground. The reset drain voltage circuitry is connected to a drain of the reset transistor, and the reset gate voltage circuitry is connected to a gate of the reset transistor.

According to one embodiment, during a hard reset operation involving the photodiode, the reset drain voltage circuitry supplies a first drain voltage to the drain of the reset transistor in accordance with a determined level of light for exposure, which is determined dynamically, and the reset gate voltage circuitry supplies a first gate voltage to the gate of the reset transistor such that the first gate voltage is greater than a sum of the first drain voltage and a threshold voltage of the reset transistor. This particular reset operation improves low light photography by reducing reset noise without sacrificing dynamic range.

According to another embodiment of the present invention, a reset operation involves a first "hard reset" phase followed by a second "soft reset" phase. During the first phase, the reset drain voltage circuitry supplies a first drain voltage to the drain of the reset transistor, and the reset gate voltage circuitry supplies a first gate voltage to the gate of the reset transistor such that the first gate voltage is greater than a sum of the first drain voltage and a threshold voltage of the reset transistor. During the second phase of the reset operation, the reset drain voltage circuitry supplies a second drain voltage to the drain, and reset gate voltage circuitry supplies a second gate voltage to the gate so that the reset transistor performs sub-threshold conduction. This reset process results in significantly reduced reset noise and significantly eliminates image lag without sacrificing or reducing dynamic range.

In another embodiment of the present invention, the pixel reset operation employs controlled voltage ramps to further optimize performance. Other features and advantages of the present invention will become more readily apparent to those of ordinary skill in the art after reviewing the following detailed description and accompanying drawings.

DETAILED DESCRIPTION OF THE INVENTION

Figure 1:
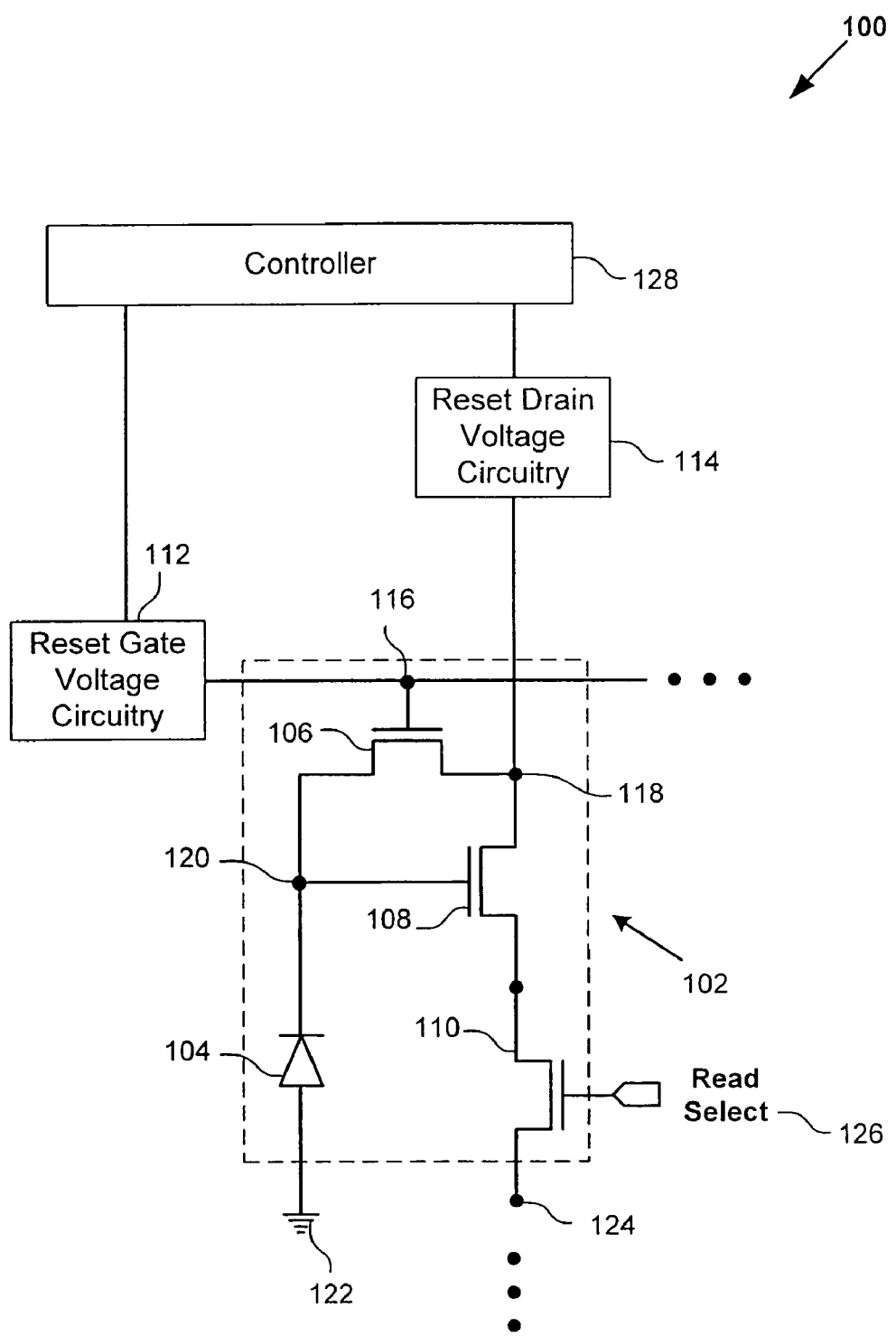
FIG. 1 illustrates a conventional CMOS image sensor according to one embodiment of the present invention.

The present invention is directed to a method of reducing reset noise in a CMOS image sensor. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings. It is noted that, for ease of illustration, the various elements and dimensions shown in the drawings are not drawn to scale.

Referring to FIG. 1, there is shown one embodiment of CMOS image sensor 100 including reset gate voltage circuitry 112 and reset drain voltage circuitry 114 in accordance with the present invention. Controller 128 is coupled to reset gate voltage circuitry 112 and reset drain voltage circuitry 114 to control the operation thereof. As described more fully below, reset gate voltage circuitry 112 and reset drain voltage circuitry 114, which operate to achieve reduced reset noise without sacrificing dynamic range in a device employing CMOS image sensor 100.

CMOS image sensor 100 comprises an array of active pixel sensors (or simply "pixels"), each of which can be represented by active pixel sensor 102. Active pixel sensor 102 comprises photodiode 104, reset transistor 106, source follower transistor 108, and select transistor 110. The drain of reset transistor 106 is connected to reset drain voltage circuitry 114 at node 118, the gate of reset transistor 106 is connected to reset gate voltage circuitry 112 at node 116, and the source of reset transistor 106 is coupled at node 120 to the cathode of photodiode 104 and to the gate of source follower transistor 108. The anode of photodiode 104 is coupled to ground 122. The drain of source follower transistor 108 is connected to node 118, and the source of source follower transistor 108 is connected to the drain of read transistor 110. The source of read transistor 110 is connected to its associated column bus at node 124, and the gate of read transistor 110 receives a read select signal 126 to activate read transistor 110 during a read operation involving active pixel sensor 102.

Before each exposure, each photodiode of CMOS image sensor 100 is reset by reverse biasing each photodiode to a potential. For example, for an N-type photodiode 104, a positive potential is applied at node 120 by way of reset transistor 106. Node 120 is also referred to as sense node 120 in the present application. After photodiode 104 is reset and reset transistor 106 is turned off, photodiode 104 is allowed to integrate, i.e., collect photoelectrons from light during an exposure, which results in a change in the potential of photodiode 104 corresponding to the exposure of light. At the end of the exposure period, the potential of photodiode 104 is determined using source follower transistor 110 and transferred to a corresponding column bus connected at node 124 by way of read transistor 110 for further processing. Photodiode 104 can again be reset for subsequent exposures.

As discussed above, conventional techniques for resetting photodiode 104 results in significant noise in the resulting image. Consider, for example, a hard reset, wherein sense node 120 is set to the highest possible potential. In a hard reset, the reset transistor 106 is turned on and the diode potential rises until the current flow is shut off at the equilibrium potential for the channel. The channel potential is set by setting the gate voltage ("Vg") potential of reset transistor 106 to be below the drain voltage ("Vd") potential by an amount at least equal to the effective threshold ("Vt") of the channel of reset transistor 106. The positive source voltage ("Vs") (corresponding to the photodiode potential) increases Vt through the body effect. This additional potential or increase to Vt is also referred to as "DELTA" in the present application. The hard reset operation is achieved whether DELTA exceed the Vd by more than Vt of reset transistor 106 under bias conditions on the source and drain terminals. As a result, the channel potential of reset transistor 106 is pinned at the Vd potential of reset transistor 106 and allows the rapid motion of charge through the low resistance of the channel to achieve an equilibrium voltage on photodiode 104 which is equivalent to the Vd potential of reset transistor 106. After a short delay, the Vg potential of reset transistor 106 is lowered to near 0 volts (V) to abruptly close the channel of reset transistor 106. When reset transistor 106 is shut off in this manner, the electrons in the channel of reset transistor 106 redistribute to the drain of reset transistor 106 and to sense node 120 connected to photodiode 104. This redistribution of the channel charge causes the potential on photodiode 104 to rise slightly, e.g., about 50 to 100 milliVolts (mV). As a consequence, the final potential on photodiode 104 is subject to an uncertainty that has a one-sigma value of $(KTC)^{1/2}$. This uncertainty or variance in the final potential on photodiode 104 results in significant noise in the resultant image, known as reset or KTC noise. This reset noise is typically 25 to 30 electrons one sigma and is caused by the random or thermal redistribution of charge during the charge transfer process described above.

This "hard" reset has the advantage that the maximum possible potential (subject to power supply limitations) is established on the photodiode and that the hard reset quickly removes any effects or information as to the previous potential on the diode. Thus there is no IMAGE Lag or excess or deficit charge stored on individual diodes from the previous light exposure.

This "hard" reset has the advantage that the maximum possible potential (subject to power supply limitations) is established on the photodiode and that the hard reset quickly removes any effects or information as to the previous potential on the diode. Thus there is no IMAGE Lag or excess or deficit charge stored on individual diodes from the previous light exposure.

This "hard" reset has the advantage that the maximum possible potential (subject to power supply limitations) is established on the photodiode and that the hard reset quickly removes any effects or information as to the previous potential on the diode. Thus there is no IMAGE Lag or excess or deficit charge stored on individual diodes from the previous light exposure.

This hard reset process has the advantage that the maximum possible potential (subject to power supply limitations) is established on photodiode 104 without the requirement for along period of time to reach the final voltage values. This maximum potential is fixed, and is chosen to maximize the final potential on the photodiode. This maximum potential attempts to ensure that the pixel has the maximum capacity for light collection. Moreover, the hard reset quickly removes any effects or information as to the previous potential on photodiode 104 because risk of residual electrons remaining in the pixel due to a slow transfer of charge at the end of the reset process is avoided. Thus, there is no image lag or excess or deficit charge stored on photodiode 104 from the previous exposure.

In contrast, a soft reset results in a reduction of reset noise, but suffers from undesirable image lag, which is a ghost image of the previous exposure. During a soft reset, the channel potential of reset transistor 106 and of photodiode 104 are rapidly set to the same level by applying the same potential to Vg and Vd of reset transistor 106, such that for reset transistor 106, Vd>Vg–Vt. As a result, the voltage at sense node 120 increases until the body effect of reset transistor 106 causes Vt of reset transistor 106 to increase and slow conduction as the channel of transistor 106 is gradually shut off. The channel potential of reset transistor 106 and the potential at sense node 120 are approximately equal as conduction is slowed and reset transistor 106 enters sub-threshold conduction. At this point, the Vd potential of reset transistor 106 is significantly more positive than the potential at sense node 120, and photodiode 104 will continue to lose electrons to Vd of reset transistor 106 by thermal emission into the channel of reset transistor 106 and then loss to the higher potential at Vd of reset transistor 106. In this manner, photodiode 104 will slowly drift towards a more positive potential until the channel potential of reset transistor 106 is higher than the potential of photodiode 104, resulting in a barrier which stops further drift of the potential of photodiode 104. This emission of electrons over a small barrier is the cause of image drift, because the above-described sub-conduction process is slow and, as such, will not reach equilibrium in a short time. Moreover, the final state of photodiode 104 is dependant upon the initial state of photodiode 104 before the start of the soft reset process. For example, if active pixel sensor 102 had been under strong illumination during a previous exposure, the starting potential of photodiode 104 would be near zero volts and the final potential of photodiode 104 would be less positive as a result of a soft reset and would reach a "quasi-static" value from a low voltage. However, if active pixel sensor 102 had been in the dark during a previous exposure, the starting potential of photodiode 104 would already be near the reset potential, and the final potential of photodiode 104 can become even more positive from electron drift over the channel to the more positive Vd as a result of a soft reset. In this manner the resulting image lags or retains a memory or ghost image of the previous exposure. This image lag is a principle disadvantage of a soft reset.

Figure 2:
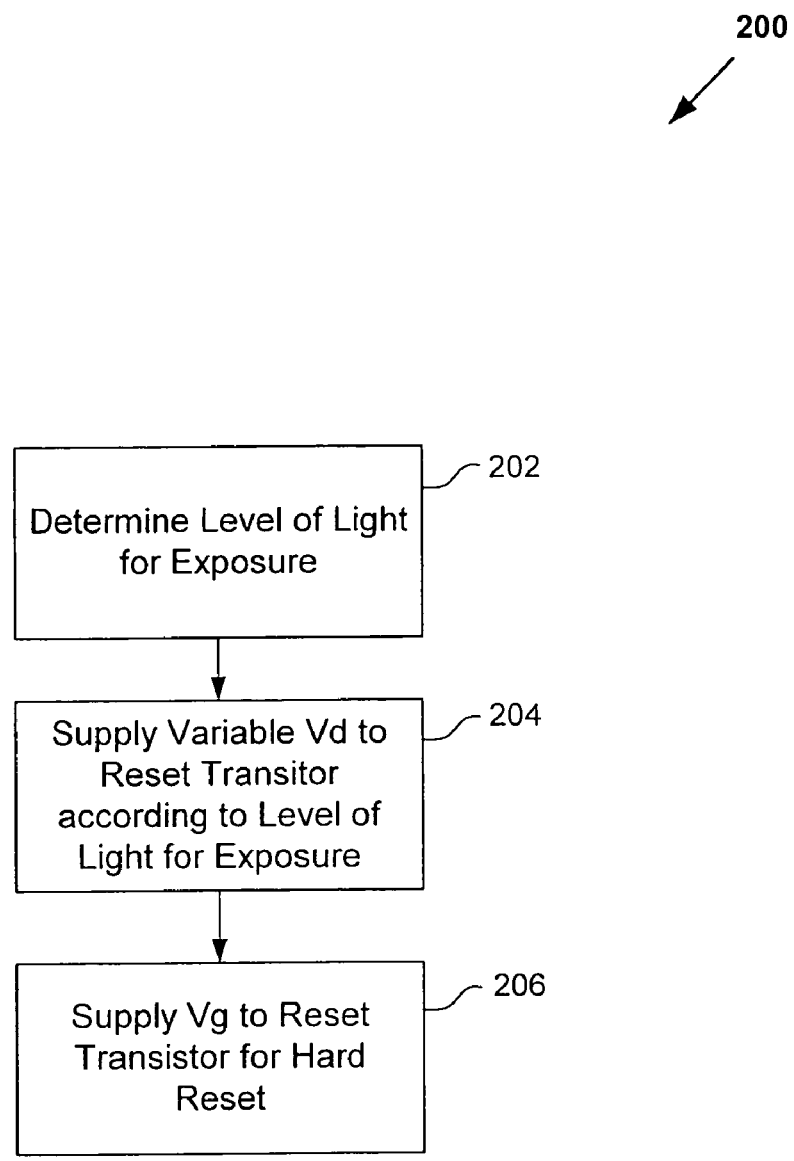
FIG. 2 illustrates a flowchart depicting the steps for carrying out a variable drain voltage photodiode reset method according to one embodiment of the present invention.
Figure 3A:
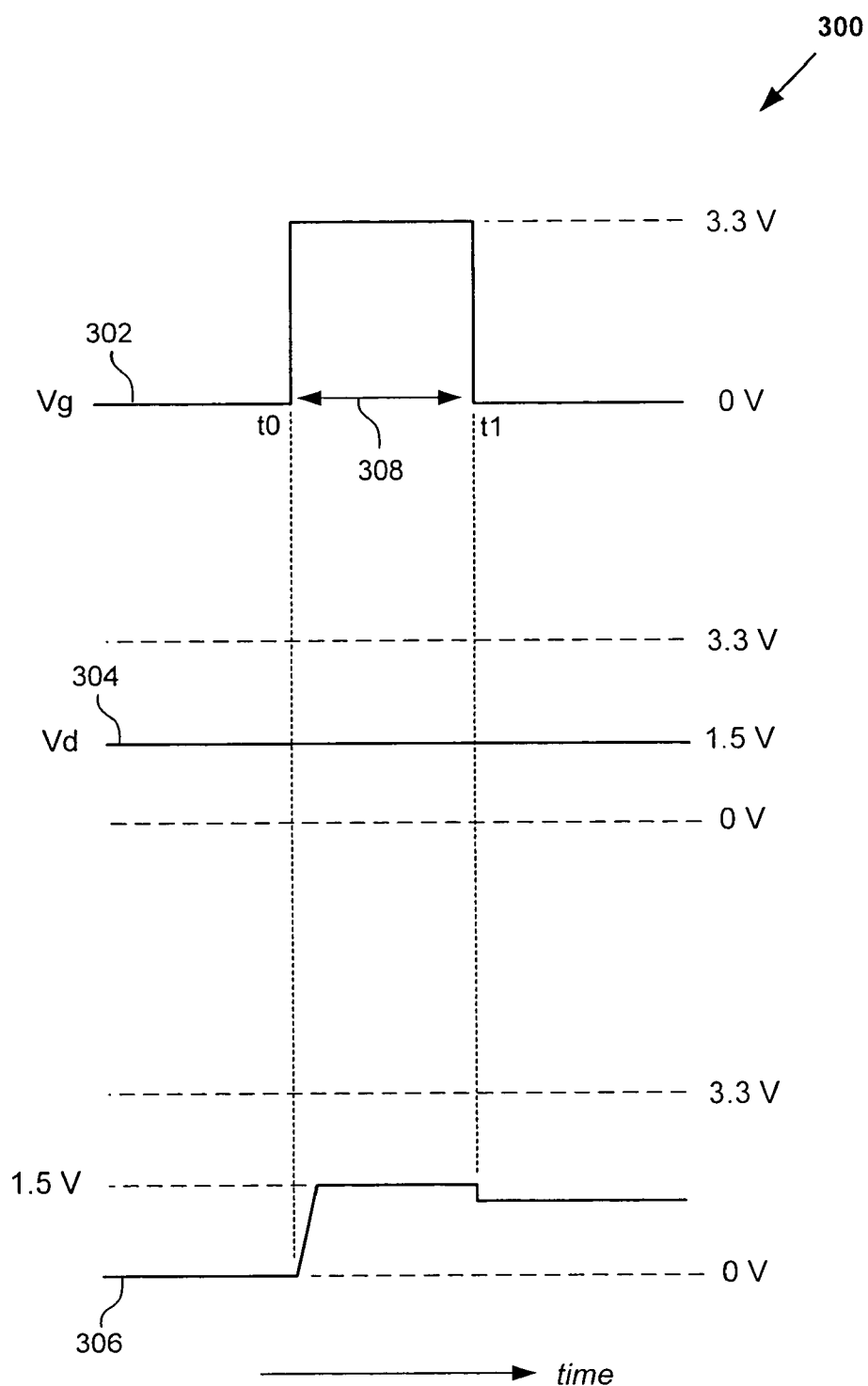
FIG. 3A illustrates a graph of transient voltage levels applied to various nodes during the variable drain voltage photodiode reset method of FIG. 2.

Referring now to FIG. 2 and FIG. 3A, FIG. 2 illustrates flowchart 200 depicting the steps for carrying out a variable drain voltage photodiode reset method in accordance with one embodiment of the present invention, which results in significantly reduced reset noise. Certain details and features have been left out of flowchart 200 which are apparent to a person of ordinary skill in the art, for example, a step may consist of one or more substeps or may involve specialized equipment, as is known in the art. While steps 202 through 206 indicated in flowchart 200 are sufficient to describe one embodiment of the present invention, other embodiments of the invention may use steps different from those shown in flowchart 200. FIG. 3A illustrates exemplary voltage levels applied to various nodes during in an embodiment operated according to flowchart 200 of FIG. 2.

Referring to FIG. 2, at step 202, a determination is made as to the level of light for the next exposure. This information can be obtained from exposure control information determined by the camera device. For example, low light conditions can be indicated by such settings as long exposure and high gain.

Next at step 204, the magnitude of the Vd potential applied to reset transistor 106 by reset drain voltage circuitry 114 during the reset process is variably set in accordance with the level of light determined during step 202. For example, in the case where low light conditions are determined, a lower Vd potential is applied to reset transistor 106. On the other hand, in the case of bright conditions, a higher Vd potential is applied to reset transistor 106.

Next at step 206, the magnitude of the Vg potential applied to reset transistor 106 by reset gate voltage circuitry in conjunction with the Vd potential applied to reset transistor 106 by reset drain voltage circuitry 114 carry out a hard reset of photodiode 104 (Vg>Vd+Vt).

FIG. 3A illustrates graph 300 of voltage levels 302, 304, and 306 respectively corresponding to Vg of reset transistor 106, Vd of reset transistor 106, and photodiode 104 potential at sense node 120 achieved according the variable drain voltage photodiode reset method of FIG. 2. Voltage levels 302 illustrate the potential on the reset FET gate or node 116 versus time. Further, voltage level 304 illustrates an example potential on the reset FET drain or node 118 of 1.5 volts, where this potential on the reset transistor 106 is variable as described in conjunction with step 204 of FIG. 2. Also, voltage levels 306 illustrate the potential on node 120 of photodiode 104 versus time according to the reset method of FIG. 2.

More particularly, the magnitude of voltage level 304 (corresponding to the Vd potential) is generated by reset drain voltage circuitry 114 and is selected in accordance with the level of light for exposure. In the particular embodiment shown in FIG. 3A, a reduced Vd potential of about 1.5V is selected for a particular low light condition, although other magnitudes of Vd potential may be used in accordance with the level of light conditions. For example, control logic may be provided to select the appropriate Vd potential for the lighting conditions. Voltage levels 302 (corresponding to the Vg potential) are generated by reset gate voltage circuitry 112. Voltage levels 302 illustrate that at time t0 reset transistor 106 is turned on to a sufficient magnitude to carry out a hard reset (i.e., Vg>Vd+Vt) for a short period of time 308, typically one or two cycles. Reset transistor is then shut off at time t1. Typically, Vg of reset transistor 106 is set to VCC during the hard reset period 308, which in the particular embodiment shown in FIG. 3A, is approximately 3.3V. Reset of photodiode 104 is thus achieved as illustrated by response signal 306, wherein the potential of photodiode 104 is set according to the amount of light for the exposure (approximately 1.5V in the present example).

Figure 3B:
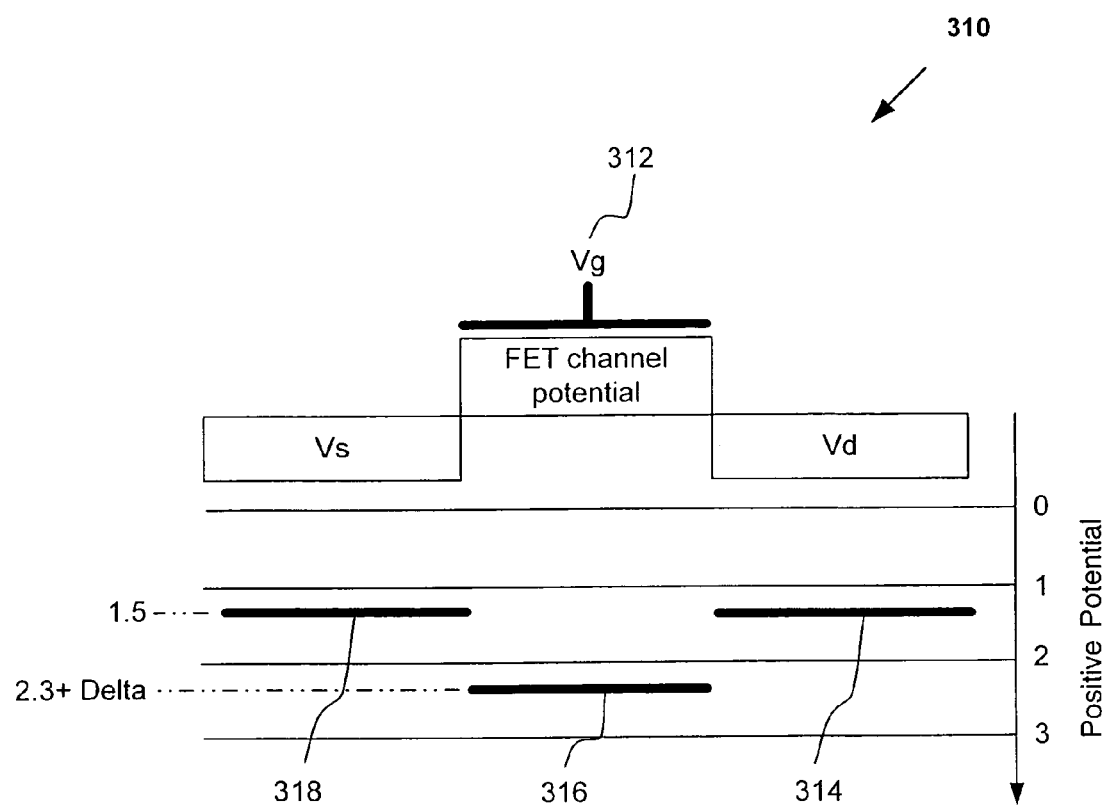
FIG. 3B illustrates a potential diagram for the reset FET achieved according to the photodiode reset method of FIG. 2.

FIG. 3B illustrates potential diagram 310 of reset transistor 106 achieved according to the variable drain voltage photodiode reset method outline in FIG. 2. As shown in FIG. 3B, Vg 312 is approximately 3.3 V; Vd 314 is approximately 1.5 V; the channel potential 314 is approximately 2.3V+ Delta; and Vs 318 (corresponding to the diode potential) is approximately 1.5 V.

This arrangement wherein the Vd potential of reset transistor 106 is dynamically configured in accordance with the level of light for the exposure advantageously achieves reduced reset noise without sacrificing dynamic range, particularly for low light exposures. In general, this technique allows the camera system to select the optimum pixel capacity for the lighting conditions and intended exposure during and results in a reduction in the reset or KTC noise by variably "selecting" the amount of pixel capacitance that is required for the picture. Reduced reset noise is achieved because during low light conditions, the potential of photodiode 104 is reset to a lower potential, thereby reducing the capacitance of sense node 120, and effectively reducing reset noise. This technique is effective because under low light conditions, a smaller number of electrons are captured, and, thus, the need for a high potential on photodiode 104 is not necessary. For example if the normal capacity of photodiode 104 when reset to 2.3V is 20K electrons with an output voltage swing of 1.2V, under low light conditions and an analog gain of 4, only 5K electrons will be captured by photodiode 104, and the total voltage swing will be reduced. Since only about 5K of electrons can be sampled in the allocated exposure time then it is not necessary to reset photodiode 104 to a capacity of 20K electrons. Accordingly, instead of selecting Vd of reset transistor 106 of about 2.3V, a lower voltage, e.g., 1.5V is selected for Vd of reset transistor 106. In this particular example, resetting photodiode 104 to a lower voltage of 1.5V will yield a hard reset to about 10K electrons, and the reset noise will be reduced by $(10/20)^{1/2}$ or about 29%. Moreover, this reduction in reset noise is achieved without any loss of the dynamic range in the picture. Furthermore, since this process achieves a hard reset, the resulting image does not have image lag. In sum, the above-discussed reset technique results in significantly improved low light photography.

Figure 4:
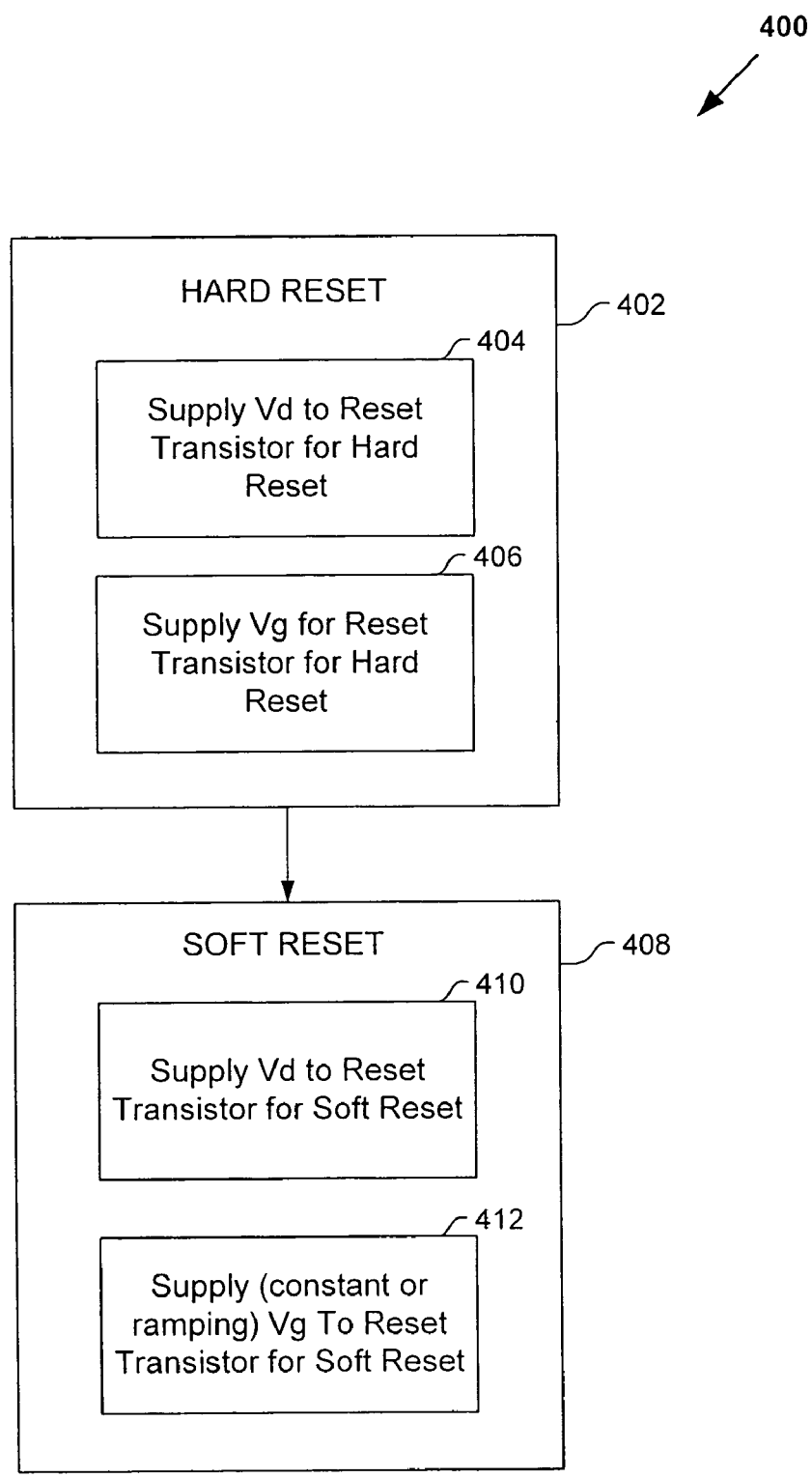
FIG. 4 illustrates a flowchart depicting the steps for carrying out a combined hard/soft photodiode reset method according to another embodiment of the present invention.
Figure 5:
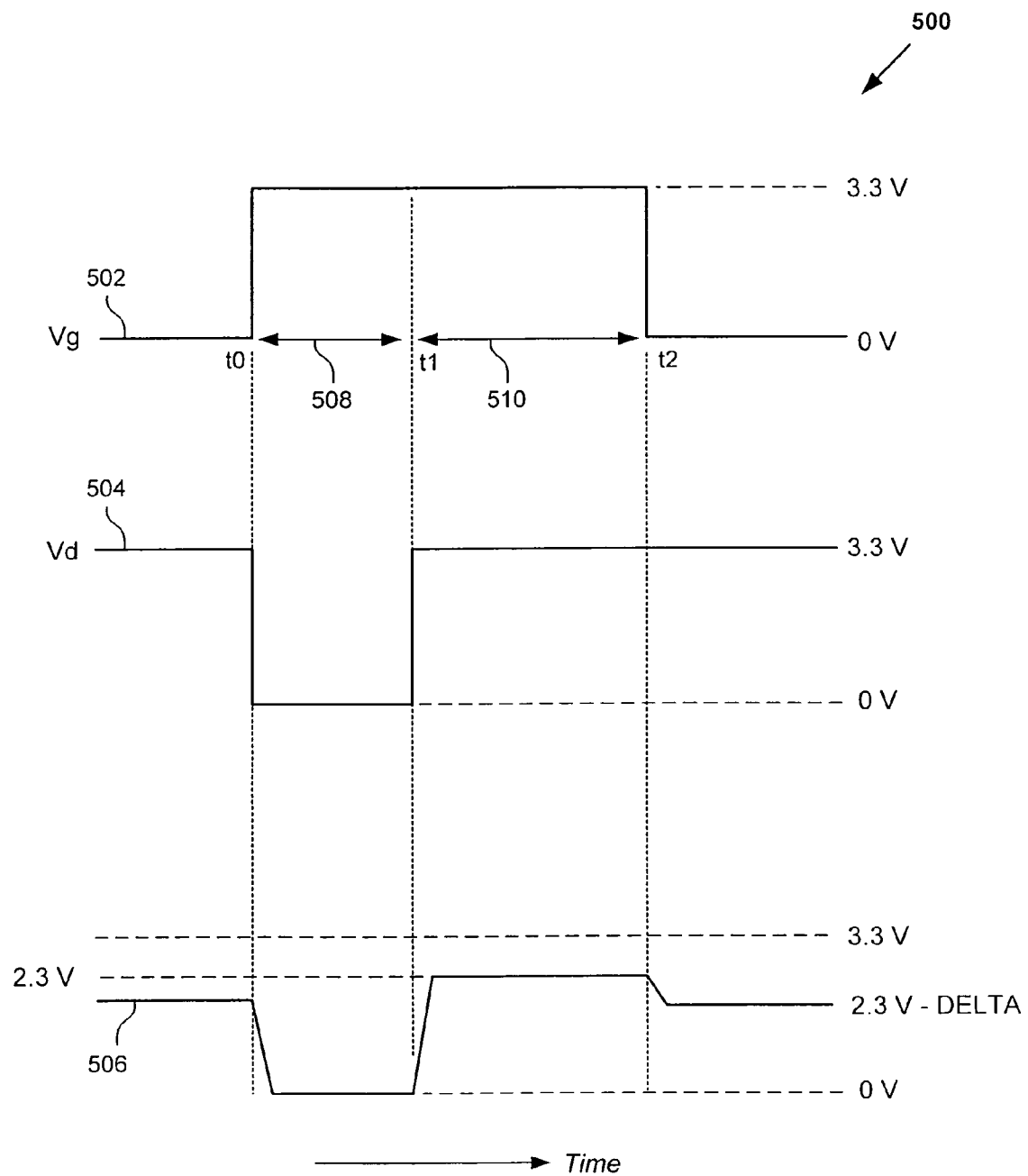
FIG. 5 illustrates a graph of transient voltage levels applied to various nodes during the combined hard/soft photodiode reset method of FIG. 4.
Figure 6:
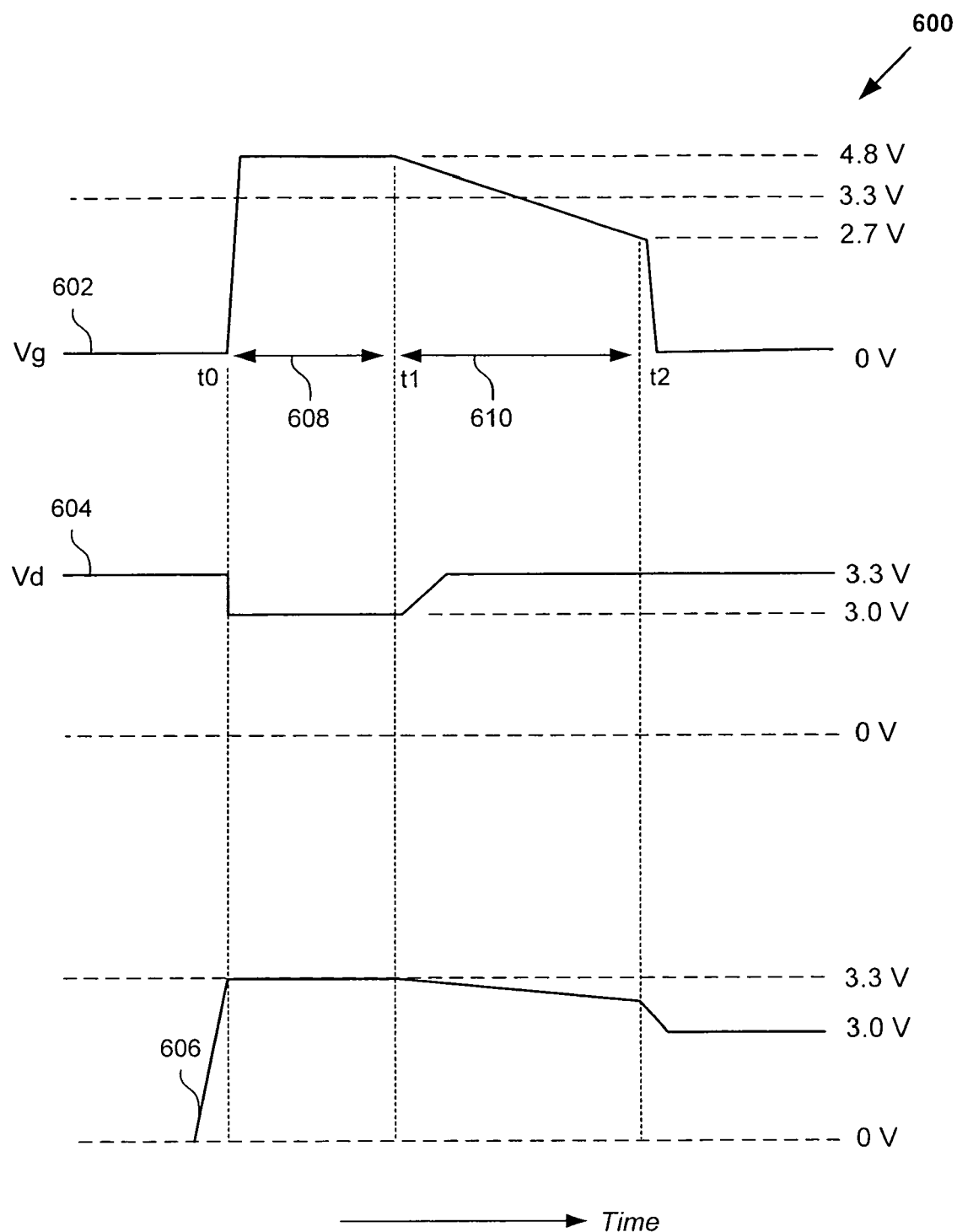
FIG. 6 illustrates a graph of transient voltage levels applied to various nodes during the combined hard/soft photodiode reset method of FIG. 4, in which more complex voltage waveforms or controlled voltage ramps are used to optimize the performance of the combined hard/soft reset method of FIG. 4.

Referring now to FIG. 4 through FIG. 6, FIG. 4 illustrates flowchart 400 depicting the steps for carrying out a combined hard/soft photodiode reset method in accordance with another embodiment of the present invention, which results in significantly reduced reset noise while achieving increased dynamic range. Certain details and features have been left out of flowchart 400 which are apparent to a person of ordinary skill in the art, for example, a step may consist of one or more substeps or may involve specialized equipment, as is known in the art. While steps 402 through 412 indicated in flowchart 400 are sufficient to describe one embodiment of the present invention, other embodiments of the invention may use steps different from those shown in flowchart 400. FIGS. 3 and 4 illustrate exemplary voltage levels applied to various nodes according flowchart 400 of FIG. 4.

Referring now to FIG. 4, flowchart 400 generally comprises performing hard reset step 402 followed by performing soft reset step 408 in accordance with an embodiment of the present invention. According to this particular embodiment, hard reset step 402 establishes the same potential on all photodiodes, e.g., photodiode 104, of CMOS image sensor 100 prior to soft reset step 408, eliminating image lag from the previous exposure. During soft reset step 408, redistribution of electrons still occurs, but since all active pixel sensors, e.g., active pixel sensor 102, drift from the same initial state due to hard reset step 402, there is no difference between pixels or discernable host image from the previous exposure. As a result of soft reset step 408, reduced reset noise for the reset process is achieved without any image lag.

Continuing with flowchart 400 of FIG. 4, an exemplary reset process is now discussed in conjunction with FIG. 5. FIG. 5 illustrates graph 500 of voltage levels 502, 504, and 506 respectively corresponding to Vg of reset transistor 106, Vd of reset transistor 106, and photodiode 104 potential at sense node 120 respectively, achieved according to the combined hard/soft photodiode reset method shown in flowchart 400. More particularly, voltage levels 504 (corresponding to the Vd potential) are generated by reset drain voltage circuitry 114 and voltage levels 502 (corresponding to the Vg potential) are generated by reset gate voltage circuitry 112 to achieve reset of photodiode 104 as illustrated by voltage levels 506 (corresponding to the photodiode potential). First time period 508 between time t0 and t1 corresponds to hard reset step 402 of flowchart 400, and second time period 510 between time t1 and t2 corresponds to soft reset step 408 of flowchart 400.

Hard reset step 402 begins at time t0 and comprises step 404 and step 406. At step 404, Vd 504 of reset transistor 106 is held at a low voltage during hard reset period 508 such that for reset transistor 106, Vd<Vg−Vt. For example, as shown in FIG. 5, Vd 504 is held to ground during hard reset period 508. At step 406, Vg of reset transistor 106 is held at a voltage to carry out a hard reset, i.e., such that for reset transistor 106, Vg>Vd+Vt. As shown in FIG. 5, Vg 502 is held to approximately 3.3V during hard reset period 508. In one embodiment, hard reset step 402 may be performed in accordance with the embodiment of FIG. 2, as described above. Hard reset period 508 ends at time t1 and is relatively short, e.g., one to two clock cycles, and results in accomplishing a hard reset of photodiode 104 to a ground potential as shown by photodiode potential signal 506 during hard reset period 508. Each active pixel sensor in CMOS image sensor is hard reset in this manner such that each photodiode is reset to the same potential at the conclusion of time t1.

Soft reset step 408 begins at time t1 and comprises steps 410 and 412. At step 410, Vd of reset transistor 106 raised to a higher potential such that for reset transistor 106, Vd>Vg−Vt, to initiate a soft reset. Also, at step 412, Vg of reset transistor 106 is held at a voltage to carry out a soft reset, i.e., such that for reset transistor 106, Vg<Vd+Vt, during soft reset period 510. As shown in FIG. 5, Vd 504 is raised to approximately 3.3 V and Vg is continually held at approximately 3.3V, such that Vd 504 is approximately equal to Vg 502 during soft reset period 510, and therefore, Vd>Vg−Vt (where Vt is approximately 1.0V). During soft reset step 408, photodiode 104 potential will quickly rise from 0V to approximately 2.3 V (3.3 Vg−1.0V Vt of reset transistor 106) at which time reset transistor 106 will operate in sub-threshold conduction. Soft reset period 510 is variable and is adjusted, e.g., during camera calibration, to yield the lowest noise floor with acceptable image lag. Soft reset period 510 is typically 5 to 10 clock cycles and ends at time t2, wherein reset transistor 106 is shut off by connecting Vg 502 to ground as shown in FIG. 5. Final potential of photodiode 104 is approximately 2.3V. As discussed above, hard reset step 402 establishes the same potential on all photodiodes, e.g., photodiode 104, of CMOS image sensor 100 thus eliminating image lag from the previous exposure, and soft reset step 408 reduces reset noise on photodiode 104 due to the sub-threshold conduction mechanism. This reset process results in significantly reduced reset noise without sacrificing or reducing dynamic range. Thus, the benefits of both hard reset (limited image lag) and soft reset (reduced noise) can be achieved in accordance with the method outline in flowchart 400.

Another exemplary reset process is now discussed in conjunction with FIG. 6. FIG. 6 illustrates graph 600 of voltage levels 602, 604 and 606 respectively corresponding to Vg of reset transistor 106, Vd of reset transistor 106, and photodiode 104 potential at sense node 120 achieved according to the combined hard/soft photodiode reset method shown in flowchart 400 of FIG. 4. Voltage level 604 (corresponding to the Vd potential) are generated by reset drain voltage circuitry 114, and voltage levels 602 (corresponding to the Vg potential) are generated by reset gate voltage circuitry 112 to achieve reset of photodiode 104 as illustrated by voltage levels 606 (corresponding to the photodiode potential). First time period 608 between time t0 and t1 corresponds to hard reset step 402 of flowchart 400, and second time period 610 between time t1 and t2 corresponds to soft reset step 408 of flowchart 400.

In the particular embodiment described in connection with FIG. 6, reset gate voltage circuitry 112 may comprise a charge pump and an analog discharge path (not shown) for shaping Vg 602 as shown in FIG. 6. This use of more complex waveforms or controlled voltage ramps on the reset gate voltages creates a number of performance advantages.

For example, the initial gate potential during the hard reset portion can be increased to allow the reset of the diode to a maximum power supply voltage for increased capacity for light collection. In this example, during hard reset period 608, Vd 604 of reset transistor 106 is supplied approximately 3.0V, and Vg 602 of reset transistor 106 is supplied a sufficient voltage potential, e.g. by a charge pump, such that, for reset transistor 106, Vg>Vd+Vt, to achieve a hard reset of photodiode 104. By way of example, Vg 602 of reset transistor 106 during hard reset period 608 is approximately 4.8V, and Vt of reset transistor 106 is approximately 1.2V in the example shown in FIG. 6. As a result, hard reset of photodiode 104 is achieved to a potential approximately equal to Vd 604, e.g., 3.0V. This results in a significant increase in the dynamic range of the sensor by allowing the photodiode to be reset to a higher voltage to provide more charge capacity when needed. Since each photodiode of CMOS image sensor 100 is hard reset in this manner, image lag is eliminated, as discussed above.

During soft reset period 610, Vd 604 of reset transistor 106 is raised to its maximum potential, e.g., approximately 3.3 V, and Vg 602 is caused to ramp down from its hard reset period potential, e.g. approximately 4.8V, to a reduced voltage, e.g. approximately 2.7V. During the slow ramp down of Vg 602, the channel potential of reset transistor 106 will become approximately equivalent to the 3.0V potential of photodiode 104, and reduced Vg 602 will only support sub-threshold conduction. As Vg 602 is lowered to below 3.1V, conduction of reset transistor 106 will stop, and the channel potential of reset transistor will stop all exchange of electrons between photodiode 104 and Vd of reset transistor 106. Ramp down period corresponding to soft reset period 610 is adjusted, e.g., during camera calibration, to yield optimum noise performance. This approach of implementing time varying voltages on Vg and Vd of reset transistor 106 results in a much higher potential established at photodiode 104 as shown in FIG. 6, which results in significantly increased dynamic range. As discussed above, this particular process also achieves reduced reset noise as a result of soft reset step 408, and eliminates or limits image lag as a result of performing hard reset step 402 prior to soft reset step 408. In addition, the use of a ramped decaying voltage during soft reset period 610 can be used to maximize the time that the diode and reset drain exchange electrons through sub-threshold conduction. This allows the soft reset to be accomplished in a minimum time interval (610). The variable voltage also ensures that appropriate sub-threshold conduction occurs even when the problem of part to part variations in the reset FET threshold occurs as is expected in a practical CMOS manufacturing process. In sum, CMOS image sensor 100 in conjunction with the reset method described above results in significantly improved CMOS camera system performance and image quality.

From the above description of exemplary embodiments of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is manifest that the specific voltage levels applied to Vg and Vd of reset transistor 106 discussed above are merely exemplary and may be modified without departing from the scope and spirit of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

Thus, a CMOS image sensor and method with reduced reset noise has been described.

What is claimed is:

1. A method of resetting a photodiode of an image sensor, said photodiode connected to a reset transistor, said method comprising:
   determining a lighting condition;
   providing a variable voltage source having an output voltage;
   setting said output voltage to a first hard reset voltage if said lighting condition indicates a first level of light for exposure and setting said output voltage to a second hard reset voltage if said lighting condition indicates a second level of light for exposure, wherein said first hard reset voltage is lower than said second hard reset voltage, and said first level of light is lower than said second level of light; and
   applying said output voltage to a drain of said reset transistor to perform a hard reset on said photodiode.

2. The method of claim 1, wherein said determining said lighting condition is performed dynamically.

3. The method of claim 1, wherein said resetting said photodiode of said image sensor is performed during one clock cycle.

4. The method of claim 1, wherein said first hard reset voltage is approximately 1.5 volts and said second hard reset voltage is approximately 2.3 volts.

5. The method of claim 1, wherein said hard reset proceeds with a soft reset.

6. The method of claim 5, wherein said soft reset comprising:
   setting said drain of said reset transistor to a voltage approximately equivalent to a voltage supplied to a gate of said reset transistor.

7. An image sensor comprising:
   a reset transistor having a drain and a source;
   a photodiode connected to said reset transistor;
   reset drain voltage circuitry connected to said drain of said reset transistor;
   reset gate voltage circuitry connected to said gate of said reset transistor;
   wherein during a reset operation, said reset drain voltage circuitry supplies a drain voltage to said drain approximately at a maximum potential, and said reset gate voltage circuitry supplies a gate voltage to said gate, wherein said gate voltage ramps down during a ramp down period so that said reset transistor performs sub-threshold conduction.

8. The image sensor of claim 7, wherein said drain voltage is approximately 3.3 volts, and said gate voltage ramps from approximately 4.8 volts to approximately 2.7 volts.

9. The image sensor of claim 7, wherein prior to said reset operation, said drain voltage is approximately 3.0 volts, and said gate voltage is greater than said drain voltage by a predetermined voltage threshold.

10. The image sensor of claim 9, wherein said predetermined voltage threshold is approximately 1.8 volts.

11. The image sensor of claim 7, wherein said ramp down period is adjustable during an image sensor calibration.

12. The image sensor of claim 7, wherein said reset operation is performed as part of a soft reset, and wherein said soft reset is preceded by a hard reset.

13. A method of resetting a photodiode of an image sensor, said photodiode connected to a reset transistor having a drain and a source, said method comprising:

supplying a drain voltage to said drain of said reset transistor approximately at a maximum potential;

supplying a gate voltage to said gate; and ramping down said gate voltage during a ramp down period so that said reset transistor performs sub-threshold conduction.

14. The method of claim 13, wherein said drain voltage is approximately 3.3 volts, and said gate voltage ramps from approximately 4.8 volts to approximately 2.7 volts.

15. The method of claim 13, wherein prior to said resetting, said drain voltage is approximately 3.0 volts, and said gate voltage is greater than said drain voltage by a predetermined voltage threshold.

16. The method of claim 15, wherein said predetermined voltage threshold is approximately 1.8 volts.

17. The method of claim 13, wherein said ramp down period is adjustable during an image sensor calibration.

18. The method of claim 13, wherein said resetting is performed as part of a soft reset, and wherein said soft reset is preceded by a hard reset.

* * * * *